(12) United States Patent
Spamer et al.

(10) Patent No.: US 7,762,574 B1
(45) Date of Patent: Jul. 27, 2010

(54) TRIM PANEL ASSEMBLY

(75) Inventors: Carl D. Spamer, Brighton, MI (US); Daniel F. Gillay, Plymouth, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 12/476,295

(22) Filed: Jun. 2, 2009

(51) Int. Cl.
  *B60R 21/16* (2006.01)
(52) U.S. Cl. .................. 280/728.2; 280/730.2
(58) Field of Classification Search ............. 280/728.2, 280/730.2
  See application file for complete search history.

(56) References Cited

U.S. PATENT DOCUMENTS

| | | | |
|---|---|---|---|
| 5,460,401 A | | 10/1995 | Gans et al. |
| 6,142,506 A | * | 11/2000 | Patel et al. ............... 280/728.2 |
| 6,234,517 B1 | * | 5/2001 | Miyahara et al. .......... 280/730.2 |
| 6,671,934 B2 | | 1/2004 | Wenzlick |
| 6,688,643 B2 | | 2/2004 | Schneider |
| 7,188,863 B2 | * | 3/2007 | Tiesler et al. ............. 280/730.2 |
| 7,325,824 B2 | * | 2/2008 | Totani et al. ............. 280/728.2 |
| 2006/0220356 A1 | | 10/2006 | Baekelandt |
| 2006/0261580 A1 | * | 11/2006 | Tiesler et al. ............. 280/730.2 |

* cited by examiner

*Primary Examiner*—Toan C To
(74) *Attorney, Agent, or Firm*—Gifford, Krass, Sprinkle, Anderson & Citkowski, P.C.

(57) ABSTRACT

A trim panel assembly configured to displace so as to allow an airbag to deploy. The trim panel assembly is mounted to the vehicle body structure and the airbag is housed between the vehicle body structure and the trim panel assembly. The trim panel assembly includes a trim panel body, a trim component, and a retainer. The trim panel body includes an aperture and the trim component is seated within the aperture. The trim component may include vehicle accessories such as a map light, or a handle. The retainer is mounted to the hidden surface of the trim panel body and attached to the trim component so as to retain the trim component to the trim panel body during airbag deployment.

10 Claims, 5 Drawing Sheets

TRIM PANEL ASSEMBLY

FIELD OF THE INVENTION

The present invention relates generally to a trim panel assembly for a vehicle. The trim panel assembly is configured to deform so as to provide a passage for an airbag to deploy. The trim panel assembly includes a trim panel body, a trim component and a retainer. The retainer retains the trim component to the trim panel body during airbag deployment.

DESCRIPTION OF MATERIAL ART

Airbag systems are commonly known and used. Such airbags may be positioned in various locations within the passenger compartment of a vehicle. For instance it is known to place a side airbag between a vehicle body structure such as an A-pillar of a vehicle and trim panel assembly. The airbag displaces a portion of the trim panel assembly with respect to the vehicle body structure and deploys into the vehicle cabin to protect the side of the passenger. Other locations include the headliner of a vehicle so as to protect the head of the occupant during an accident.

The vehicle is configured to house the airbag and the components necessary to deploy the airbag. Such airbag deployment components include an inflator operable to blow air into the airbag and expand the airbag into the passenger compartment. The airbag is commonly disposed behind a trim panel body. In some instances the trim panel body includes a seam which is weakened relative to the trim panel. Inflation of the airbag causes the airbag to break through the seam and deploy into the passenger cabin.

In another common embodiment of a vehicle airbag configuration, the airbag is disposed between the vehicle body structure and the trim panel body, and an end portion of the trim panel body is configured to deform and displace relative to the vehicle body structure so as to provide a passage for which the airbag may deploy through. In either instance, the trim panel body is made of material having sufficient tensile strength so as to provide a passage for which the airbag may deploy, and yet is not so strong so as to impede the deployment of the airbag into the vehicle cabin.

It is commonly known to mount trim components onto the trim panel body. The trim component may support vehicle accessories such as lights, or hooks. However, such components may be pushed off the trim panel body during airbag deployment. Accordingly, it is known to tether the trim component to the vehicle body structure so as to retain the trim component to the trim panel body. In essence, the trim component is anchored to the vehicle body structure so as to prevent the trim component from disengaging the trim panel body.

However, there are instances where it may not be physically possible to use a tether to secure the trim component to the vehicle body structure. For instance, other vehicle structure such as an air duct may prevent the trim component from being attached to the vehicle body structure. Accordingly, the trim component must be attached to something other than the vehicle body structure in order to keep the trim component attached to the trim panel body during airbag deployment.

However, using a tether to attach the trim component to the trim panel body is not acceptable because the trim panel body must remain flexible enough to allow the airbag to deploy and thus is made of material that is not strong enough to retain the tether. Whereas vehicle body structure is made of material such as steel and thus is sufficient to retain the tether and thus pressure from airbag deployment is not sufficient to rip the tether from the vehicle body structure. It follows that if a tether were to be used to secure the trim component to the trim panel body, the inflating airbag may cause the trim component to rip the tether out of the trim panel body.

Accordingly it remains desirable to have a trim panel assembly having a retainer mounted onto the trim panel body that retains the trim component to the trim panel body during airbag deployment and yet does not interfere with the deployment of the airbag.

SUMMARY OF THE PRESENT INVENTION

The present invention provides a trim panel assembly mounted to a vehicle body structure. An airbag is disposed between the trim panel assembly and the vehicle body structure. The trim panel assembly is configured to be displaced by the airbag as the airbag is inflated so as to provide a passage for the airbag to deploy within a predetermined location of the vehicle cabin. The trim panel assembly includes a trim panel body, a trim component, and a retainer. The retainer includes a base mounted to the hidden surface of the trim panel body and retaining member mounted to the base. The retaining member is also operatively attached to the trim component so as to retain the trim component to the trim panel body and further control the environment during airbag deployment.

DETAILED DESCRIPTION OF A PREFERRED EMBODIMENT OF THE PRESENT INVENTION

Figure 1:
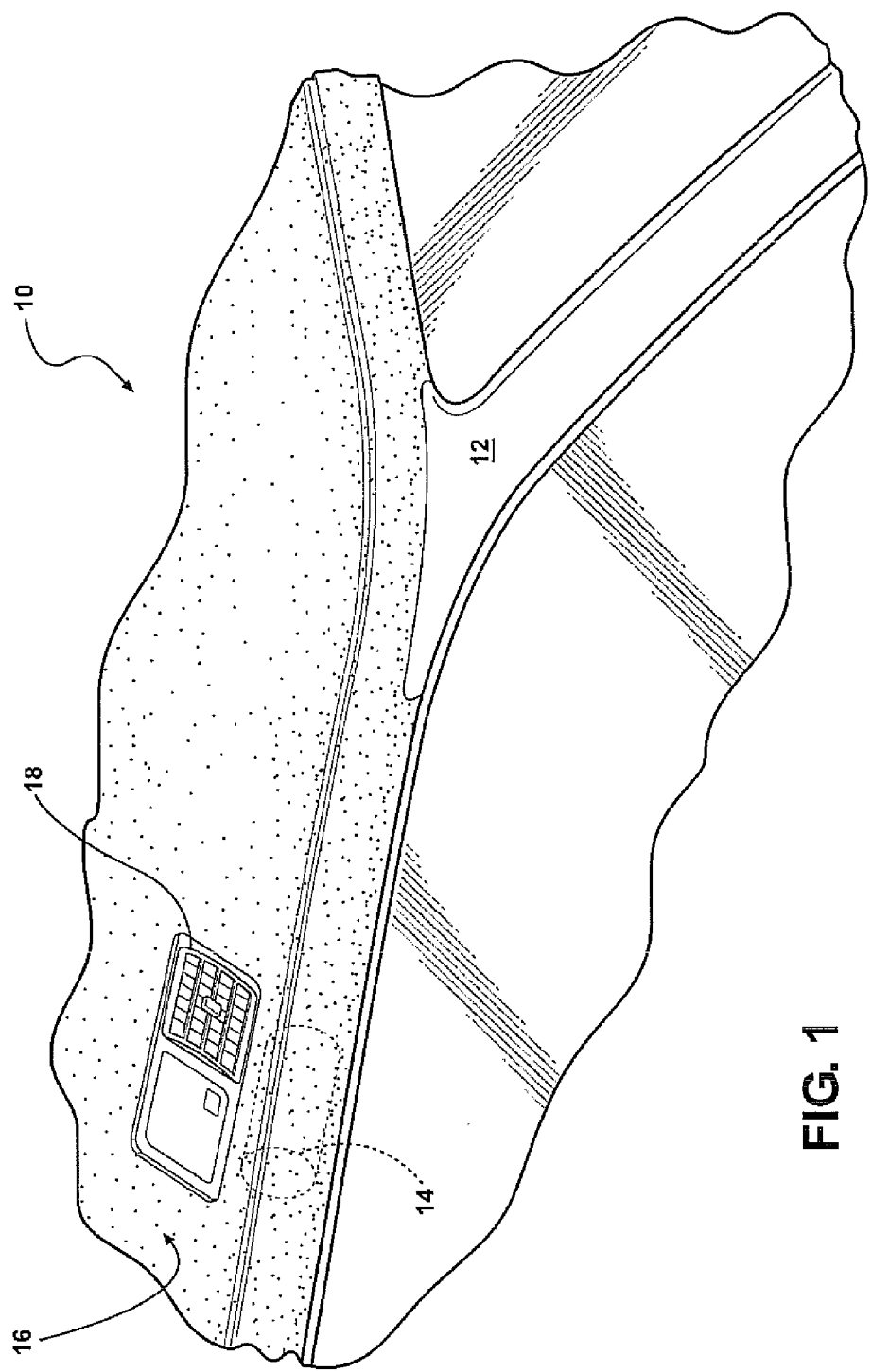
FIG. 1 is a view of the trim panel assembly mounted to the vehicle body structure.
Figure 2:
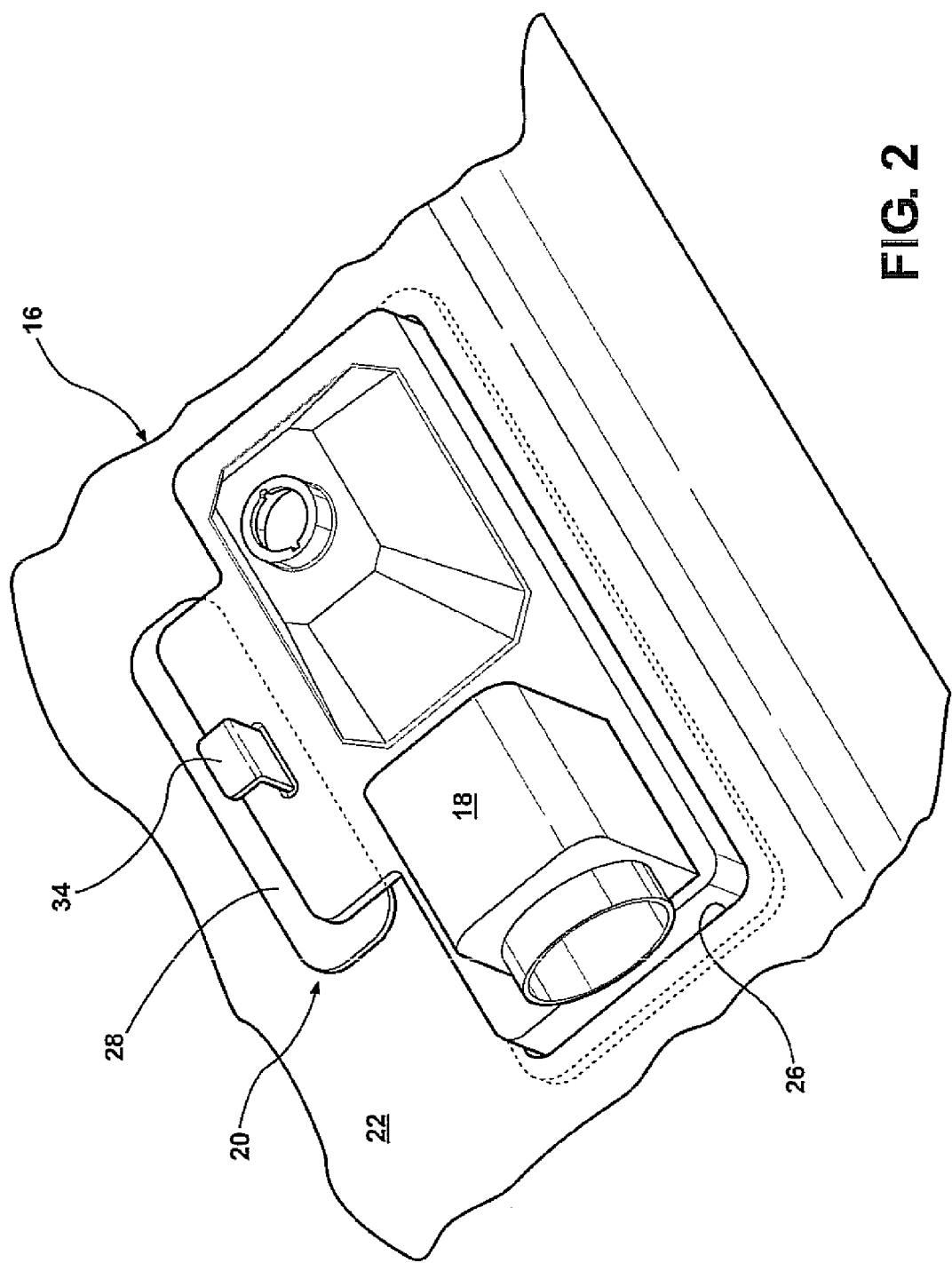
FIG. 2 is a view of the hidden surface of the trim panel body, showing the retainer and the trim component attached to the retainer.

With reference first to FIG. 1, an illustration of a trim panel assembly 10 according to the present invention is illustrated. The trim panel assembly 10 is mounted onto the vehicle body structure 12. An airbag 14 is disposed between the trim panel assembly 10 and the vehicle body structure 12. The trim panel assembly 10 is configured to deform so as to allow an airbag 14 to deploy in a predetermined manner. The trim panel assembly 10 includes a trim panel body 16, trim component 18, and a retainer 20. The retainer 20 is secured to the trim panel body 16 and operatively attached to the trim component 18.

The trim panel body 16 is formed from material having sufficient strength to support the trim component 18 and yet flexible enough to allow the airbag 14 to deploy in a predetermined manner. Any material currently known and used in the art to make trim panel bodies 16 is adaptable for use herein.

The trim panel body 16 has a hidden surface 22 spaced apart and opposite and a cabin surface 24. The cabin surface 24 is exposed to the vehicle cabin. The trim panel body 16 also includes an aperture 26. The airbag 14 is housed between the hidden surface 22 of the trim panel body 16 and the vehicle body structure 12. Additional airbag 14 components such as an inflator (not shown) may also be housed between the hidden surface 22 of the trim panel body 16 and the vehicle body structure 12. A sensor (not shown) is provided. The sensor detects the state of the vehicle to determine if the airbag 14 should deploy. Preferably the sensor is also in communication with a processor (not shown). The processor is in communication with the inflator and will actuate the inflator so as to deploy the airbag 14 when the sensor detects that airbag 14 deployment is proper. As the airbag 14 inflates, pressure is applied against the hidden surface 22 of the trim component 18. The airbag 14 displaces the trim panel body 16 and deploys into the vehicle cabin. The pressure may be sufficient to cause the trim component 18 to become dislodged from the trim panel body 16.

The retainer 20 prevents the trim component 18 from being dislodged during airbag 14 deployment. The retainer 20 may be formed from any material having sufficient strength to retain a trim component 18 subjected to pressure caused by the deploying airbag 14. Any such material currently known and used in the art is adaptable for use herein, illustratively including metal or a hardened polymer.

The retainer 20 is operatively attached to the trim component 18 and fixedly secured to the hidden surface 22 of the trim panel body 16. The retainer 20 includes a base 28 and a retaining member 30. The base 28 has a generally planar contact surface 32 and is secured to the hidden surface 22 of the trim panel body 16 using an adhesive or other known methods such as heat weld, hot melt glue, and the like. The retaining member 30 is operatively attached to the trim component 18 so as to provide a predetermined amount of movement of the trim component 18 during airbag 14 deployment. Thus, the retainer 20 does not decrease the flexibility of the trim panel assembly 10 so as to interfere with the deployment of the airbag 14. The trim component 18 is retained onto the hidden surface 22 of the trim panel body 16 by the retainer 20. Additionally, the predetermined amount of movement of the trim component 18 is limited so as to prevent the trim component 18 from being removed from the trim panel body 16.

With reference now to FIGS. 2, 3B, 4 and 5, a first preferred embodiment of the trim panel assembly 10 is provided. In the first preferred embodiment, the retaining member 30 of the retainer 20 is a hook 34 and the trim panel assembly 10 is the headliner assembly of a vehicle. An edge of the trim panel body 16 is attached to a corresponding edge of the A-pillar 36. The trim panel body 16 is spaced apart from the A-pillar 36 so as to provide room for an airbag 14 and a ventilation duct 38. As shown, the ventilation duct 38 is disposed between the vehicle body and the trim panel body 16 and prevents the use of the tether.

The retainer 20 is stamped out of metal and includes a base 28. The base 28 has a contact surface 32 adapted to flushingly engage the hidden surface 22 of the trim panel body 16. The retainer 20 further includes a hook 34 extending from the base 28 and away from the hidden surface 22 of the trim panel body 16.

The trim component 18 includes a map light mounted onto the outer surface of the trim component 18 so as to shine light into the cabin of the vehicle and a vent assembly. The trim component 18 is seated within the aperture 26 of the trim panel body 16. The trim component 18 is bounded by a flange 40. The flange 40 has an inner surface 42 flushingly mounted onto the cabin surface 24 of the trim panel body 16 so as to completely cover the aperture 26.

The airbag 14 is configured to deploy between the vehicle body structure 12 and the trim panel body 16. More specifically, as the airbag 14 is inflated, the airbag 14 exerts a load onto the lower edge of the trim component 18 so as to displace the lower edge of the airbag 14 with respect to the vehicle body. The airbag 14 continues to inflate and deploy into a designated area within the vehicle cabin. Accordingly, the trim panel body 16 is configured to maintain a predetermined amount of flexibility so as to allow the airbag 14 to properly deploy.

The trim component 18 includes a retaining member 30. The retaining member 30 is spaced apart from the flange 40 and includes a retaining slot 44. Preferably the retaining slot 44 is larger than the hook 34 so as to provide a predetermined amount of space 46 between the edges defining the slot and the hook 34. This space provides for manufacturing tolerances of the stamped retainer 20 and a predetermined degree of movement for the trim component 18. Specifically, the predetermined amount of space 46 allows the trim component 18 to move with a certain degree of freedom subject to airbag 14 inflation deployment of the airbag 14. Thus, the retainer 20 is configured to maintain the flexibility of the trim panel body 16 so as to not interfere with the airbag 14 deploying between the trim panel body 16 and the vehicle body structure 12.

However, the retainer 20 is configured to retain the trim component 18 to the trim panel body 16 so as to maintain a controlled environment during airbag 14 deployment. Accordingly, as the trim component 18 experiences a load from the inflating airbag 14, the trim component 18 becomes displaced from the aperture 26. However, the retaining slot 44 slides along the hook 34 and is stopped from further movement. More specifically, the trim component 18 is retained onto the trim component 18 by the base 28 and hook 34 of the retainer 20.

Figure 3A:
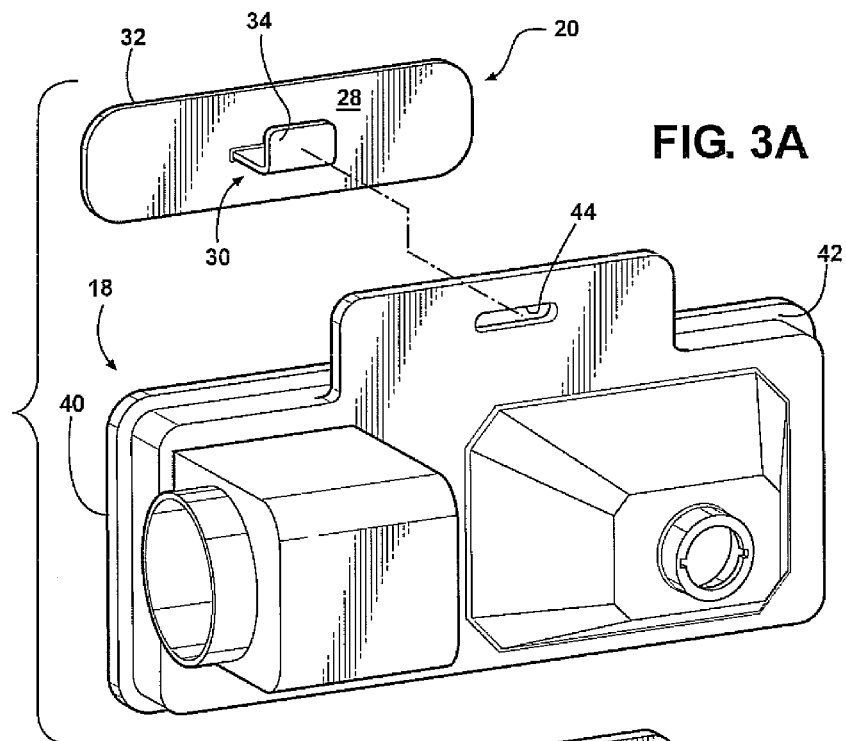
FIG. 3A is a view of the first preferred embodiment of the trim panel assembly.
Figure 3B:
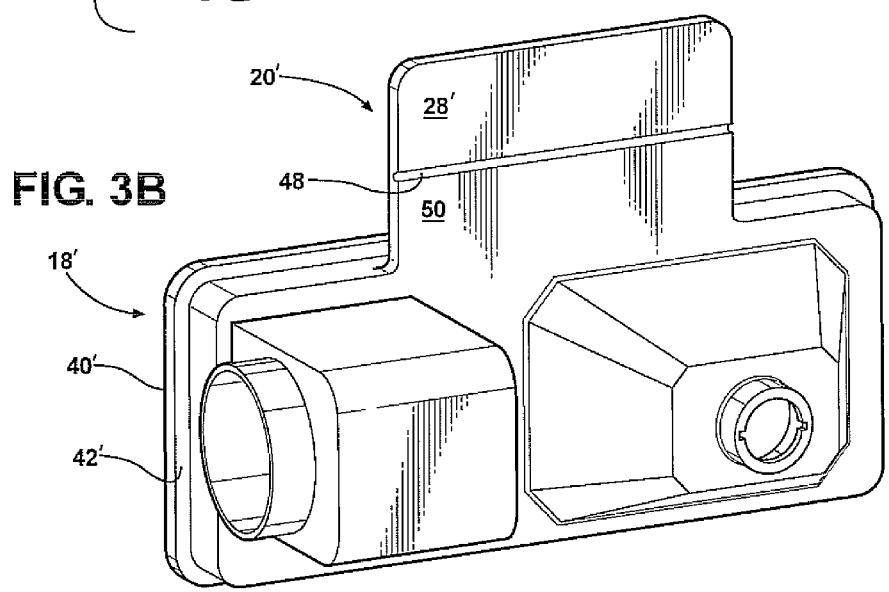
FIG. 3B is a view of the second preferred embodiment of the trim panel assembly.
Figure 4:
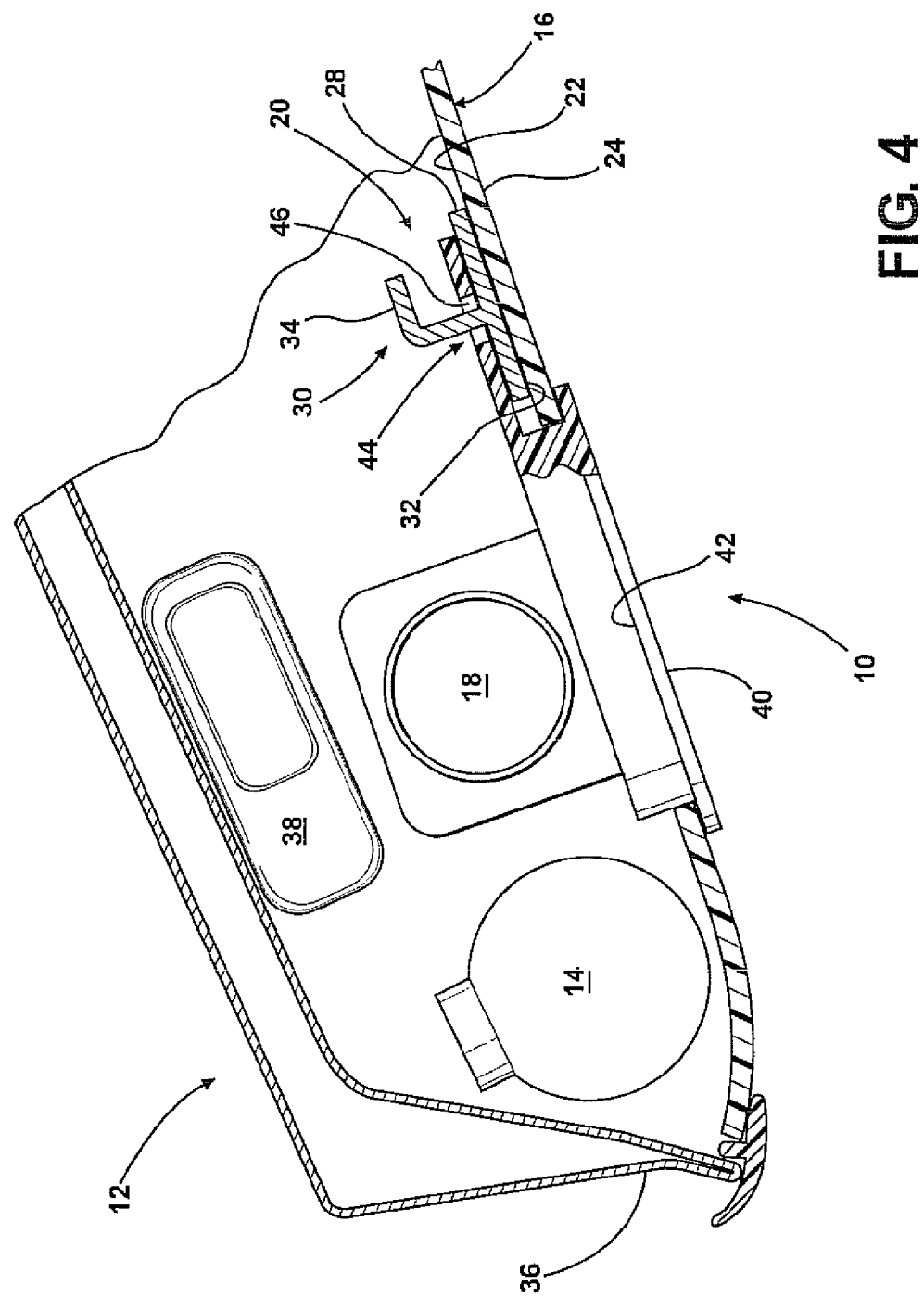
FIG. 4 is a cross-sectional view of the trim panel assembly mounted to the vehicle body structure.
Figure 5:
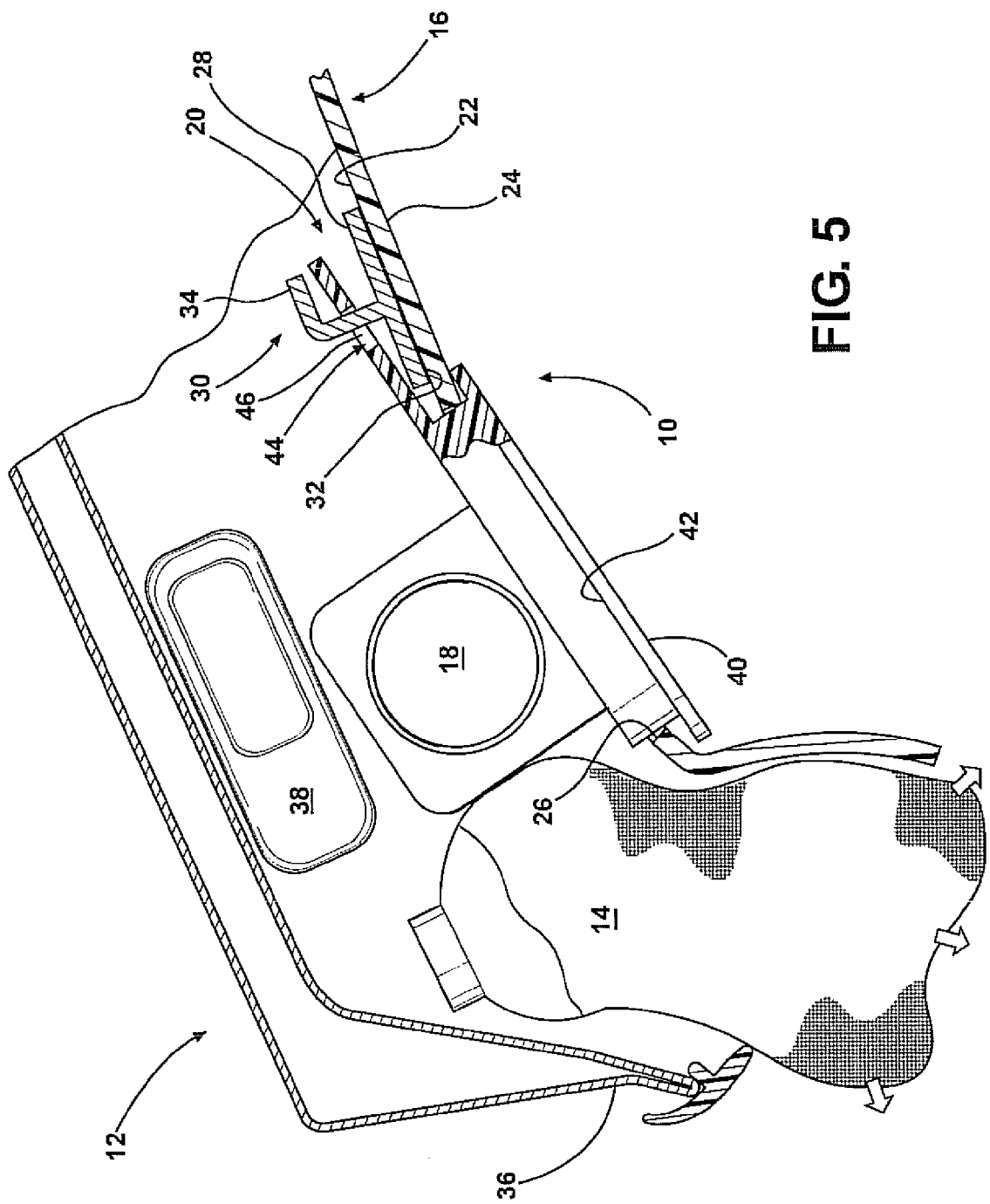
FIG. 5 is a view of FIG. 4 showing the displacement of the trim panel body as the airbag is deployed.

With reference now to FIG. 3B a second preferred embodiment of the trim panel assembly 10 is provided wherein like parts are indicated by the same reference numeral followed by an apostrophe. In the second preferred embodiment, the retaining member 30' is a living hinge 48 interconnecting the base 28' to the trim component 18'. Preferably the retainer 20' is molded out of a polymer such as polypropylene.

The living hinge 48 may be a fold extending transversally across the base 28' and interconnects the base 28' to a first member 50. The first member 50 may be integrally formed to the inner surface 42' of the trim component 18'. Alternatively, the first member 50 may be mounted onto the inner surface 42' of the trim component 18' using techniques currently known and used in the art, illustratively including vibration welding, thermo-fusing and the like. As with the first preferred embodiment, inflation of the airbag 14' causes the trim component 18' to become displaced from the aperture 26'. However, the trim component 18 remains mounted to the hidden surface 22' of the trim panel body 16' so as to help maintain a controlled environment during airbag 14' deployment.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, it is clear that the invention may be practiced other than as specifically described.

We claim:

1. A trim panel assembly mounted onto the vehicle body structure so as to cover an airbag, wherein the trim panel assembly is configured to displace upon inflation of the airbag so as to provide a passage for the airbag to deploy, the trim panel assembly comprising:

a trim panel body mounted to the vehicle body structure and covering the air bag, the trim panel body having a hidden surface, a cabin surface opposite the hidden surface, and an aperture;

a trim component mounted onto the cabin surface of the trim panel body and seated within the aperture of the trim panel body;

a retainer having a base and a retaining member fixedly secured to the base, base mounted onto the hidden surface of the trim panel body, and the retaining member attached to the trim component, the trim component pivotably attached to the base so as to retain the trim component to the trim panel body but permitting movement of the trim panel during airbag deployment.

2. The trim panel assembly as set forth in claim 1, wherein the base has a contact surface configured to flushingly engage the hidden surface of the trim panel body.

3. The trim panel assembly as set forth in claim 2, wherein the base is mounted onto the hidden surface of the trim panel body using adhesives.

4. The trim panel assembly as set forth in claim 1, wherein the trim panel component includes a flange, the flange bounding the trim panel component so as to cover the aperture when the trim component is seated therein.

5. A trim panel assembly mounted onto the vehicle body structure so as to cover an airbag, wherein the trim panel assembly is configured to displace upon inflation of the airbag so as to provide a passage for the airbag to deploy, the trim panel assembly comprising:

a trim panel body mounted to the vehicle body structure and covering the air bag, the trim panel body having a hidden surface, a cabin surface opposite the hidden surface, and an aperture;

a trim component mounted onto the cabin surface of the trim panel body and seated within the aperture of the trim panel body, the trim component having a slot;

a retainer having a base and a hook pivotably secured to the base, base mounted onto the hidden surface of the trim panel body, and the hook is engaged with the slot of the trim component so as to retain the trim component to the trim panel body but permitting movement of the trim panel during airbag deployment.

6. The trim panel assembly as set forth in claim 5, wherein the slot is configured so as to provide a predetermined amount of space between the hook and the slot when the hook is mounted therein.

7. The trim panel assembly as set forth in claim 5, wherein the retainer is stamped from metal.

8. A trim panel assembly mounted onto the vehicle body structure so as to cover an airbag, wherein the trim panel assembly is configured to displace upon inflation of the airbag so as to provide a passage for the airbag to deploy, the trim panel assembly comprising:

a trim panel body mounted to the vehicle body structure and covering the air bag, the trim panel hod having a hidden surface, a cabin surface opposite the hidden surface, and an aperture;

a trim component mounted onto the cabin surface of the trim panel body and seated within the aperture of the trim panel body;

a retainer having a base mounted onto the hidden surface of the trim panel body; and a living hinge interconnecting the base to the trim component, the trim component pivotably attached to the base so as to retain the trim component to the trim panel body but permitting movement of the trim panel during airbag deployment.

9. The trim panel assembly as set forth in claim 8, wherein the living hinge is molded out of polypropylene.

10. The trim panel assembly as set forth in claim 9, wherein the living hinge is a fold and interconnects the base to a first member, and wherein the first member is attached to the trim component.

* * * * *

UNITED STATES PATENT AND TRADEMARK OFFICE
CERTIFICATE OF CORRECTION

| | | |
|---|---|---|
| PATENT NO. | : 7,762,574 B1 | Page 1 of 1 |
| APPLICATION NO. | : 12/476295 | |
| DATED | : July 27, 2010 | |
| INVENTOR(S) | : Carl D. Spamer et al. | |

It is certified that error appears in the above-identified patent and that said Letters Patent is hereby corrected as shown below:

Column 6, line 17 replace "hod" with --body--

Signed and Sealed this

Seventh Day of December, 2010

David J. Kappos
*Director of the United States Patent and Trademark Office*